United States Patent
Koch (10) Patent No.: US 11,260,304 B1
(45) Date of Patent: Mar. 1, 2022

(54) PROVABLE FAIRNESS FOR CHALLENGES AMONG PLAYERS IN AN ONLINE GAMING PLATFORM

(71) Applicant: Mythical, Inc., Sherman Oaks, CA (US)

(72) Inventor: Rudy Koch, Sammamish, WA (US)

(73) Assignee: Mythical, Inc., Sherman Oaks, CA (US)

( * ) Notice: Subject to any disclaimer, the term of this patent is extended or adjusted under 35 U.S.C. 154(b) by 0 days.

(21) Appl. No.: 17/225,299

(22) Filed: Apr. 8, 2021

(51) Int. Cl.
*A63F 13/75* (2014.01)
*A63F 13/537* (2014.01)

(52) U.S. Cl.
CPC ............ *A63F 13/75* (2014.09); *A63F 13/537* (2014.09)

(58) Field of Classification Search
CPC .............................. A63F 13/537; A63F 13/75
See application file for complete search history.

(56) References Cited

U.S. PATENT DOCUMENTS

| | | | | |
|---|---|---|---|---|
| 8,272,961 | B2 * | 9/2012 | Busey | ...................... A63F 13/12 463/42 |
| 9,440,151 | B2 * | 9/2016 | Van Luchene | .......... A63F 13/79 |
| 10,518,178 | B1 | 12/2019 | Cunningham | |
| 10,850,202 | B1 | 12/2020 | Koch | |
| 10,861,095 | B1 | 12/2020 | Koch | |
| 10,984,400 | B1 | 4/2021 | Koch | |
| 11,138,580 | B1 | 10/2021 | Koch | |
| 11,141,664 | B1 | 10/2021 | Koch | |
| 11,207,604 | B1 | 12/2021 | Koch | |
| 2001/0018366 | A1 * | 8/2001 | Shimomura | .............. A63F 1/00 463/43 |
| 2003/0109299 | A1 * | 6/2003 | Reizei | ..................... A63F 13/10 463/11 |
| 2004/0147308 | A1 * | 7/2004 | Walker | .................... G07F 17/32 463/25 |
| 2006/0017229 | A1 * | 1/2006 | Hayakawa | ................ A63F 1/00 273/292 |

(Continued)

OTHER PUBLICATIONS

Gamefaqs, "How do you bet pink slips?" https://gamefaqs.gamespot.com/ps2/938452-juiced-2-hot-import-nights/answers/190010-how-do-you-bet-pink-slips. Created 2010. (Year: 2020).*

(Continued)

*Primary Examiner* — Reginald A Renwick
(74) *Attorney, Agent, or Firm* — Esplin & Associates, PC (57) ABSTRACT

Systems and methods to provide provable fairness for challenges among users in an online gaming platform are disclosed. Exemplary implementations may: effectuate presentations of challenge interfaces that enable users to define objectives for challenges, define stakes for challenges, specify users to partake in the challenges, and initiate transmissions pertaining to the challenges to client computing platforms of other users as defined and specified; effectuate presentations of offers (to partake in a challenge) to other users; receive indications of acceptances of these offers; generate sets of instructions that form smart contracts that obtain determined results of challenges and distribute stakes based on the determined results; transfer generated sets of instructions to one or more decentralized ledger servers for execution; and determine the results of the challenges and distribute the stakes based on the results.

16 Claims, 4 Drawing Sheets

(56) References Cited

U.S. PATENT DOCUMENTS

| | | | |
|---|---|---|---|
| 2006/0258463 A1* | 11/2006 | Cugno | A63F 13/35 463/42 |
| 2007/0191103 A1* | 8/2007 | Van Luchene | G07F 17/32 463/42 |
| 2008/0033734 A1* | 2/2008 | Carry | G06Q 50/188 705/39 |
| 2008/0070689 A1* | 3/2008 | Van Luchene | G07F 17/32 463/42 |
| 2008/0139318 A1* | 6/2008 | Van Luchene | A63F 13/12 463/42 |
| 2008/0167122 A1* | 7/2008 | Maeda | A63F 13/577 463/30 |
| 2008/0227512 A1* | 9/2008 | Lang | G07F 17/3293 463/11 |
| 2012/0290977 A1 | 11/2012 | Devecka | |
| 2013/0143670 A1* | 6/2013 | Junkin | A63F 13/85 463/42 |
| 2013/0288788 A1* | 10/2013 | Lim | A63F 13/42 463/31 |
| 2014/0045586 A1 | 2/2014 | Allen | |
| 2014/0206452 A1 | 7/2014 | Bambino | |
| 2015/0001799 A1* | 1/2015 | Cullen | A63F 11/0002 273/292 |
| 2015/0163311 A1 | 6/2015 | Heath | |
| 2015/0371499 A1 | 12/2015 | Sansregret | |
| 2018/0304159 A1* | 10/2018 | Campos | A63F 13/46 |
| 2019/0180329 A1 | 6/2019 | Chetlur | |
| 2019/0197831 A1* | 6/2019 | Batton | G06Q 20/123 |
| 2019/0236594 A1 | 8/2019 | Ehrlich-Quinn | |
| 2019/0282906 A1 | 9/2019 | Yong | |
| 2019/0299105 A1 | 10/2019 | Knight | |
| 2019/0311341 A1 | 10/2019 | Rice | |
| 2020/0155944 A1* | 5/2020 | Witchey | G06F 16/27 |
| 2020/0202668 A1 | 6/2020 | Cotta | |
| 2020/0294133 A1 | 9/2020 | Cella | |
| 2020/0311721 A1 | 10/2020 | Ow | |
| 2020/0320644 A1 | 10/2020 | Hollis | |
| 2020/0357246 A1 | 11/2020 | Nelson | |
| 2021/0019987 A1 | 1/2021 | Cohen | |
| 2021/0027281 A1 | 1/2021 | Kilroe et al. | |
| 2021/0042830 A1 | 2/2021 | Burke | |
| 2021/0118085 A1* | 4/2021 | Bushnell | G06Q 50/34 |

OTHER PUBLICATIONS

GauthierDickey & Ritzdorf, in "Secure Peer-to Peer Trading for Multiplayer Games," IEEE (Year: 2012).

* cited by examiner

PROVABLE FAIRNESS FOR CHALLENGES AMONG PLAYERS IN AN ONLINE GAMING PLATFORM

FIELD OF THE DISCLOSURE

The present disclosure relates to systems and methods to provide provable fairness for challenges among players in an online gaming platform.

BACKGROUND

Online gaming platforms are known. Users of online gaming platforms earning or winning in-game digital assets is known, e.g., through tournaments or other types of competition. Distributed ledgers are known techniques to produce a secure record or registry of ownership of assets, transactions, and other information. For example, a distributed blockchain is a distributed ledger.

SUMMARY

One aspect of the present disclosure relates to a system configured to provide provable fairness for challenges among users in an online gaming platform. The system includes one or more processors configured by machine-readable instructions. The one or more processors may be configured to execute, within the online gaming platform, an instance of a game to facilitate presentation of the game to users, and implement in-game actions in the instance of the game in response to action requests for the in-game actions by the users. The presentation of the game is based on views of the game that are determined during execution of the instance of the game. The users include at least a first user, a second user, and a third user that interact with the instance of the game. The one or more processors may be configured to effectuate presentations of challenge interfaces that enable users to define objectives for challenges, define stakes for challenges, specify users to partake in the challenges, and initiate transmissions pertaining to the challenges to client computing platforms of other users as defined and specified. The one or more processors may be configured to effectuate presentations of offers (to partake in a challenge) to other users. The one or more processors may be configured to receive indications of acceptances of these offers. The one or more processors may be configured to generate sets of instructions that form smart contracts that obtain determined results of challenges and distribute stakes based on the determined results. The one or more processors may be configured to transfer generated sets of instructions to one or more decentralized ledger servers. The one or more processors may be configured to determine results of challenges. The decentralized ledger server may be configured to receive and execute sets of instructions.

Another aspect of the present disclosure related to a method of providing provable fairness for challenges among users in an online gaming platform. The method may include executing, within the online gaming platform, an instance of a game to facilitate presentation of the game to users, and implementing in-game actions in the instance of the game in response to action requests for the in-game actions by the users, wherein the presentation of the game is based on views of the game that are determined during execution of the instance of the game, wherein the users include a first user, a second user, and a third user that interact with the instance of the game. The method may include effectuating presentations of challenge interfaces that enable users to define objectives for challenges, define stakes for challenges, specify users to partake in the challenges, and initiate transmissions pertaining to the challenges to client computing platforms of other users as defined and specified. The method may include effectuating presentations of offers (to partake in a challenge) to other users. The method may include receiving indications of acceptances of these offers. The method may include generating sets of instructions that form smart contracts that obtain determined results of challenges and distribute stakes based on the determined results. The method may include transferring generated sets of instructions to one or more decentralized ledger servers. The method may include determining results of challenges. The method may include receiving and executing sets of instructions.

As used herein, any association (or relation, or reflection, or indication, or correspondency) involving servers, processors, client computing platforms, assets, requests, exchanges, challenges, offers, transactions, in-game actions, rights, benefits, ownership, users, contracts, metrics, metric values, scores, gains, trigger events, incentives, proposals, sets of instructions, operations, determinations, distributions, transfers, presentations, interfaces, notifications, and/or another entity or object that interacts with any part of the system and/or plays a part in the operation of the system, may be a one-to-one association, a one-to-many association, a many-to-one association, and/or a many-to-many association or "N"-to-"M" association (note that "N" and "M" may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect, both local and remote. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

DETAILED DESCRIPTION

Figure 1:
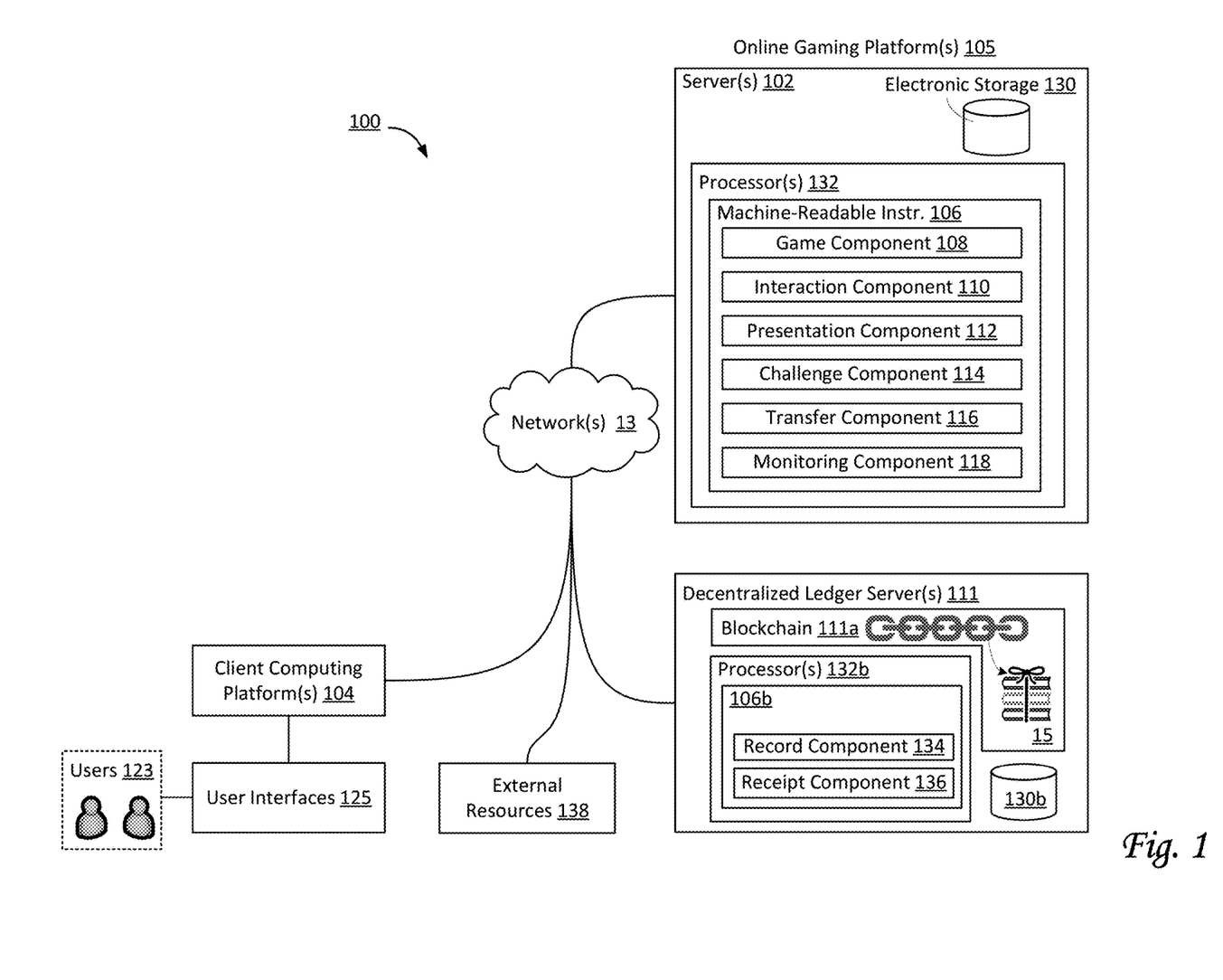
FIG. 1 illustrates a system configured to provide provable fairness for challenges among users in an online gaming platform, in accordance with one or more implementations.

FIG. 1 illustrates a system 100 configured to provide provable fairness for challenges among users in an online gaming platform 105, in accordance with one or more implementations. System 100 may include one or more online gaming platforms 105, decentralized ledger server(s) 111, one or more client computing platform(s) 104, user interfaces 125, servers 102, one or more external resources 138, and/or other components. Users 123 (also referred to as players) may include one or more of a first user, a second user, a third user, a fourth user, and/or other users. Users 123 may include players who play and/or otherwise interact on online gaming platform 105. As used in descriptions herein, any use of the term "user" may refer to user(s) 123. Electronic storage 130a may be similar to electronic storage 130 as described elsewhere in this disclosure, though included in decentralized ledger servers 111.

Instances of online games may be executed within one or more online gaming platforms 105. As used herein, online gaming platform 105 may refer to either an individual game (e.g., an interactive online game), a type of gaming console and its ecosystem, and/or both. Online gaming platform 105 may be configured to host (and/or execute instances of) the one or more (online) games. Online gaming platform 105 may be operated, hosted, and/or owned by one or more stakeholders of online gaming platform 105. For example, a platform operator (and/or another stakeholder) may sell in-game digital assets (e.g., characters, weapons, resources, etc.) to users 123 of online gaming platform 105.

As used herein, challenges refer to an individual user challenging one or more other users in an instance of a game. For example, a challenge may be a player-to-player challenge. For example, a challenge may be a user-initiated challenge (and may be not initiated or controlled by the game-logic of the instance of a game). In some implementations, challenges are not initiated or controlled by online gaming platform 105 itself. Instead, an individual user may challenge another user to a contest, a competition, and/or another type of challenge for which success, failure, winning and/or defeat can be determined (within the instance of the game, based on in-game actions by the participants). For example, the individual user may determine and/or select which other user is offered a chance to participate in the challenge). In some implementations, a challenge must include participants that have mutually exclusive goals, such that at least one participant wins and at least one participant loses (unless the challenge itself somehow is not completed, concluded, and/or otherwise invalidated). Barring foul play, cheating, disqualifications, and other exceptions, a challenge produces a winner and a loser, and the winner wins something from the loser.

For example, a particular challenge may be a race to be the first participant to reach a particular location in the instance of the game. For example, a particular challenge may be a contest to kill the most enemy combatants in a 15-minute timespan starting at a particular moment. For example, a particular challenge may be a test of skill to build a particular object or reach a particular location or shoot a particular object from a particular distance, say, within an hour. For example, a particular challenge may be a competition to gather the most virtual items of a particular type in a particular timespan. In some implementations, any achievement a player could (or does) brag about could form the basis for a player-initiated challenge. For example, a player could suggest he can throw a pigskin over them mountains. A player-initiated challenge could settle such a matter. As another example, a player could challenge another player to hit a small target at a long distance with his sniper rifle. As another example, a player could challenge another player to a best 3-out-of-5 rock-paper-scissors game (assuming there are in-game actions similar to throwing rock, or paper, or scissors).

The provable fairness for challenges is provided by an independent and impartial arbiter mechanism that is used to determine the results of challenges (e.g., which user wins, and which user loses). In some implementations, the same mechanism may be used to distribute the stake of a challenge (e.g., the one or more virtual items that the winner wins from the loser). This independent and impartial arbiter mechanism includes one or more smart contracts that are recorded on a decentralized ledger, such as a blockchain. Execution of the code and/or other instructions in the smart contracts is not under control of any of the participating users. In some implementations, smart contracts may use (challenge-related) information from online gaming platform 105 (e.g., from a monitoring component), from a blockchain oracle (e.g., providing off-chain data to the blockchain), and/or from external resource 138 to determine the results of challenges. Arbitration of challenges may be provable since it depends on publicly available code that is transparent to any participant, and it is fair because the code is independent from and impartial to the participating users.

For example, in some cases, the stake for a challenge is provided by one of the players. If the other player succeeds at the objective of the challenge (e.g., wins the challenge), the other player receives the stake as provided. If, however, the other player fails to succeed, no stake is provided to the other player. As another example, in some cases, the stake for a challenge is provided by both of the players. Perhaps each player provides one or more virtual items from his or her inventory as their part of the stake. Whichever player wins the challenge receives both parts of the stake. The virtual item may be an in-game digital asset (e.g., the ownership rights to a user-controllable character, certain distribution rights, and/or other virtual items or objects).

Referring to the game and to online gaming platform 105, in some implementations, individual players may own individual virtual items, and exchange these items with (or to) other individual players. As used herein, exchanges refer to individual players winning, losing, auctioning, selling, purchasing, trading, bartering, wagering, staking, and/or otherwise exchanging digital assets (directly, without a store or store interface under control of online gaming platform 105) to other individual players or with other individual players (including exchanging virtual items and/or other assets through challenges). Due to an exchange, ownership rights of a digital asset may transition from an original owner to a new owner (even if there may, in some implementations, be one or more intermediary and/or temporary owners during the process of performing the exchange). In some implementations, digital assets may be associated with other rights than ownership rights, such as, by way of non-limiting example, distribution rights.

In some implementations, distribution rights of digital assets may reflect rights held by the individual ones of the users to receive certain distributions of benefits upon exchanges involving particular digital assets. That is, the individual users may own/hold rights to particular digital assets that guarantee them benefits upon (future) exchanges involving those digital assets regardless of whether the individual users owns/hold the ownership rights for those digital assets. In some implementations, the distribution gains may result from a particular action or activity (such as, e.g., a sale of a particular digital asset), e.g., within the online gaming platform 105, of a particular digital asset. As used herein, a distribution gain resulting from a particular action or activity may include one or more of a portion of the proceeds of the particular action or activity, a fee related to the particular action or activity, a minimum payment triggered by the occurrence of the particular action or activity (or a set of particular actions or activities), and/or another arrangement for payment and/or compensation, including but not limited to combinations of fixed fees, minimum fees, percentages of sales, percentages of profits, and/or other arrangements. The term "portion" does not imply or require a percentage or ratio, but rather is intended to signify that beneficiaries (i.e., the users that hold the distribution rights) may receive something of value and/or use. The distribution gains may include one or more virtual currencies such as virtual tokens, virtual stars, virtual points, virtual real-world currencies (e.g., US Dollars), and/or other gains that are based on the particular digital assets.

In some implementations, the digital assets may include and/or be virtual items that are not fungible and may be usable within an online gaming platform 105. In some implementations, the digital assets may represent three-dimensional in-game user-controllable characters that can interact with other (in-game) virtual items within online gaming platform 105. By way of non-limiting example, digital assets may represent virtual items. In some implementations, virtual items may include one or more of weapons, toys, characters, abilities, skills, tools, pets, clothing, vehicles, game levels, missions, assignments, chapters, tasks, mini-games, restricted areas within a virtual space, restricted modes of gameplay, access rights within an online game, and/or other virtual items. In some implementations, virtual items may refer to any item or object within online gaming platform 105 for which a user may use, own, sell, trade, destroy, and/or otherwise effectuate a change of ownership (including exchanging virtual items and/or other assets through challenges). As used herein, a digital asset is fungible if it is functionally and/or physically indistinguishable from another digital asset. For example, a payment token such as a Bitcoin may be a fungible digital asset. A digital asset may be non-fungible if it is unique, or one-of-a-kind. For example, a specific individual CryptoKitty™ may be a non-fungible digital asset. A digital asset may be semi-fungible if there is a set of a limited number of similar but distinguishable digital assets. For example, a limited-edition Blanko™ or another in-game character may be a semi-fungible digital asset. For example, one of a limited number of 2-dimensional or 3-dimensional in-game virtual items may be a semi-fungible digital asset. For example, a digital ticket to a show, concert, exhibition, and/or other event may be a semi-fungible digital asset. For example, a piece of art or jewelry (e.g., as a virtual item or as representing a physical item) may be a semi-fungible digital asset. As used herein, both non-fungible and semi-fungible digital assets are considered as "not fungible" digital assets. In some implementations, digital assets may be usable within one or more games.

In some implementations, blockchain 111a may be maintained by a distributed computing platform (not shown in FIG. 1). In some implementations, the distributed computing platform may be implemented by a set of client computing platforms and/or servers (including, for example, one or more decentralized ledger servers 111). The distributed computing platform may support a virtual machine (not shown in FIG. 1). The distributed computing platform and/or the virtual machine may form a runtime environment for smart contracts and/or other executable code. The distributed computing platform includes electronic storage configured to store part or all of blockchain 111a. The smart contracts may be stored on blockchain 111a. In some implementations, the distributed computing platform may be the EOSIO platform. In some implementations, the distributed computing platform may be Ethereum. In some implementations, the distributed computing platform may be similar to Ethereum. In some implementations, the virtual machine may be a decentralized virtual machine.

Elements of blockchain 111a may be grouped together in units that are referred to as blocks. For example, an individual block may include one or more assets and one or more transactions. For example, an individual block may be linked to one or more other individual blocks. Individual blocks may be linked or chained together to form a structure of blocks and/or a hierarchy of blocks, such as, e.g., a chain of blocks. An individual block may include one or more assets, one or more transactions, and/or other information.

Decentralized ledger server(s) 111 may include one or more of electronic storage 130a, processor(s) 132a, machine-readable instructions 106a, (node of) blockchain 111a, and/or other components. Machine-readable instructions 106a may include one or more instruction components. The instruction components may include computer program components. The instruction components may include one or more of a record component 134, a receipt component 136, and/or other instruction components. In some implementations, an individual decentralized ledger server 111 may be dedicated to a particular node of blockchain 111a. Typically, different nodes are included in (or implemented by, or hosted by) different servers or different computer systems to increase the safety and security of transactions on a blockchain. The consensus protocol used for a particular blockchain will be harder to falsify or circumvent when the different nodes are in different geographical locations, on different types of computing platforms, and/or otherwise distributed and diverse. As depicted in FIG. 1, blockchain 111a may include a smart contract 15 (by way of non-limiting example, smart contract 15 may have been recorded on blockchain 111a).

In some implementations, blockchain 111a may be publicly accessible. In some implementations, blockchain 111a may be private and/or permissioned. In some implementations, blockchain 111a may be append-only. In some implementations, existing blocks of blockchain 111a can substantially not be altered or deleted, unless multiple copies are altered. This is unlikely to happen provided that the multiple copies stored on different computing platforms, e.g., in different geographical locations. Blockchain 111a may be replicated on multiple computing platforms, preferably in multiple different geographical locations. Additionally, individual blocks may be linked together in a manner that prevents tampering, such as, e.g., using a hash chain and/or digital signatures. In particular, hash values may be generated using fixed-output-length one-way hashing functions that take variable-length input, and may be effectively impossible (or, at least, computationally infeasible) to reverse. As such, a hashing function may provide one-way encryption. By way of non-limiting example, the hashing function may be SHA-256, BLAKE2, SHAKE256, and/or another hashing function. Contents of individual blocks, transactions, and/or assets may be digitally signed in a manner that proves integrity and/or prevents tampering, e.g., by providing authentication.

Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104. In some implementations, system 100 and/or decentralized ledger server(s) 111 may be configured to communicate with one or more of online gaming platform(s) 105, users 123, and/or other entities and/or components, e.g., through one or more networks 13.

Server(s) 102 may include electronic storage 130, processor(s) 132, machine-readable instructions 106, and/or other components. Processor(s) 132a may be similar to processor(s) 132 as described elsewhere in this disclosure, though included in decentralized ledger servers 111. Machine-readable instructions 106a may be similar to machine-readable instructions 106 as described elsewhere in this disclosure, though included in decentralized ledger servers 111. Server(s) 102 may be configured by machine-readable instructions 106. Machine-readable instructions 106 may include one or more instruction components. The instruction components may include computer program components. The instruction components may include one or more of a game component 108, an interaction component 110, a presentation component 112, a challenge component 114, a transfer component 116, a monitoring component 118, a record component 134, a receipt component 136, and/or other instruction components.

In some implementations, game component 108 may be configured to execute, via online gaming platform 105, an instance of a game. The instance of the game may facilitate presentation of the game to users 123. For example, the instance of the game may be an online game executed with online gaming platform 105. Game component 108 may be configured to implement in-game actions in the instance of the game, e.g., in response to action requests for the in-game actions by the users. In some implementations, game component 108 may be arranged, organized, and/or otherwise included in online gaming platform 105. As used herein, the term "game" may refer to one or more games within online gaming platform 105. In some implementations, the game may be provided via a virtual space, and may include a plurality of resource types and/or maps.

The presentation of the game may be based on the views of the game that are determined during execution of the game, e.g., as based on instructions and/or other input from users. In some implementations, the view may be communicated (e.g., by streaming, via object/position data, and/or other information) from online gaming platform 105, decentralized ledger server(s) 111, and/or other sources to client computing platforms 104 for presentation to users 123. The view determined and transmitted to a given client computing platform 104 may correspond to a location in the virtual space (e.g., the location from which the view is taken, the location the view depicts, and/or other locations), a zoom ratio, a dimensionality of objects, a point-of-view, and/or other view parameters. In some implementations, one or more view parameters may be selectable by a user.

The instance of the game may include a simulated space that is accessible by users 123 by clients (e.g., client computing platforms 104) that present the views of the virtual space to a user. The simulated space may have a topography, express ongoing real-time interaction by one or more users 123, and/or include one or more objects positioned within the topography that are capable of locomotion and/or movement within the topography. In some implementations, the topography may be a 2-dimensional topography. In some implementations, the topography may be a 3-dimensional topography. The topography may include dimensions of the simulated space, and/or surface features of a surface or objects that are native to the simulated space. In some implementations, the topography may include a surface (e.g., a ground surface) that runs through at least a substantial section of the simulated space. In some implementations, the topography may describe a volume with one or more bodies positioned therein. The instance executed by the computer components may be synchronous, asynchronous, and/or semi-synchronous.

Within the instance of the game, users 123 may control characters, objects, simulated physical phenomena, and/or other elements within the virtual space to interact with the virtual space and/or each other. The user characters may include avatars. As used herein, the term "user character" may refer to an object or group of objects present in the virtual space, that correspond(s) to an individual user. A particular user character may be controlled by the particular user with which it is associated. Such user characters may be referred to as user-controlled characters. User-controlled element(s) may move through and interact with the virtual space (e.g., non-user characters in the virtual space, other objects in the virtual space, etc.). In some implementations, user-controlled characters may be capable of locomotion within the topography of the simulated space that is included in the instance of the game. In some implementations, user-controlled elements controlled by and/or associated with a given user may be created and/or customized by the given user. Individual users 123 may have an "inventory" of virtual goods and currency (e.g., resources of the plurality of resource types) that the individual user can use (e.g., by manipulation of a user character and/or other user-controlled elements) and/or other items, to perform in-game actions within the virtual space. By way of non-limiting illustration, users 123 may include the first user and the second user that interact with online gaming platform 105. The first user and the second user may control digital assets (e.g., characters) in a game hosted by online gaming platform 105. In some implementations, user inventories may be managed (at least in part) using blockchain 111a. For example, ownership rights (and/or other types of rights) of individual virtual items included in an individual user inventory may be recorded on blockchain 111a. In some implementations, individual user inventories may correspond to individual smart contracts stored on blockchain 111a.

Interaction component 110 may be configured to enable, facilitate, and/or implement in-game actions by users 123 in instances of games. In some implementations, interaction component 110 may be configured to operate in response to instructions and/or action requests by users 123. For example, one or more users may interact within online gaming platform 105 to build, create, gather, find, combine, and/or otherwise generate content (i.e., user-generated content). In some implementations, operations may be accomplished by interaction component 110 through user interfaces 125. In particular, operations pertaining to a particular user may be accomplished through a particular user interface 125 of a particular client computing platform 104, where the particular client computing platform 104 is associated with the particular user. In other words, the particular user may interact with an instance of a game through interaction component 110 and/or the particular user interface 125. For example, interaction component 110 may be configured to receive indications of acceptance from users, through associated client computing platforms 104 (or, e.g., a particular user interface 125 of a particular client computing platform 104). For example, an acceptance may accept an offer to partake in a particular challenge. In some implementations, interaction component 110 may be configured to receive indications of agreements from users, through associated client computing platforms 104 (or, e.g., a particular user interface 125 of a particular client computing platform 104). For example, an agreement may agree to an offer to partake in a particular challenge.

In some implementations, interaction component 110 may be configured to facilitate interaction of users 123 with system 100. In some implementations, interaction component 110 may be configured to facilitate interaction by users 123 through user interfaces 125. For example, a particular user may be associated with a particular client computing platform 104, which may include a particular user interface 125. In other words, an individual user interface may be user-specific. In some implementations, interaction component 110 may facilitate entry and/or selection through (presentation of) one or more user interfaces 125 (such as, by way of non-limiting example, a challenge interface, as described in this disclosure).

Presentation component 112 may be configured to present interfaces (e.g., user interfaces 125) to users, e.g., through client computing platforms 104 associated with the respective users. In some implementations, presentation component 112 may be configured to effectuate presentations of interfaces to users. The presented interfaces may include challenge interfaces, as described in this disclosure. In some implementations, presentations by presentation component 112 may be performed jointly (or at least in some cooperative manner) with one or both of game component 108 and/or interaction component 110. Presentation component 112 may present offers (from other users) to particular users, as described elsewhere in this disclosure.

In some implementations, a challenge interface may enable a user to define an objective for a challenge. For example, the user may enter and/or select the objective through a graphical user interface element such as, by way of non-limiting example, a (text input) field, a drop down menu, check boxes, virtual buttons, and/or other graphical user interface elements. The objective may be to be the first (or fastest) participating user to reach or obtain something in the instance of the game, or the most successful or prolific (e.g., in dispatching enemy combatants), or any other objective as previously described. In some implementations, an objective may be associated with a particular timespan, period, or other type of duration (which may also be entered and/or selected by the user). For example, the challenge may be to participate in a race, and the objective may be to win that race. In some implementations, objectives must be defined such that exactly one participating user succeeds at the objective. In some implementations, an objective could be defined so that zero or one participating user succeeds at the objective (e.g., if no participating user succeeds, none of the participating users receives the entire stake, parts of which may either be returned or forfeited).

In some implementations, a challenge interface may enable a user to define a stake for a challenge (particularly, for the challenge the user defined an objective for). For example, the user may enter and/or select the stake (for one user, or for multiple users, or for all users participating in the challenge) through a graphical user interface element such as, by way of non-limiting example, a (text input) field, a drop down menu, check boxes, virtual buttons, and/or other graphical user interface elements. For example, the stake may include one or more virtual items, ownership rights to a user-controllable character, certain distribution rights, and/or other virtual items or objects. In some implementations, the stake may include an amount of a currency. In some implementations, a challenge interface may include multiple parts that correspond to the multiple participating users. For example, a first participating user may define a first part of the stake in a first (part of a particular) challenge interface, and a second participating user may define a second part of the same stake in a second (part of the particular) challenge interface, and so forth.

In some implementations, a challenge interface may enable a particular user to specify one or more other users as proposed participating users. For example, a proposed participating user may receive an offer to partake in a particular challenge. For example, the particular user may enter and/or select one or more other users through one or more graphical user interface elements. In some implementations, a specified user could be selected from a list of known users. In some implementations, a specified user could be selected from nearby users (e.g., users within a predetermined proximity from the particular user, which may be further filtered by other characteristics and/or preferences). In some implementations, the particular user may specify that a particular challenge is open to anyone.

In some implementations, a challenge interface may enable users to initiate transmissions of offers for users to partake in challenges. In some implementations, a challenge interface may enable users to initiate transmissions of information representing offers for users to partake in challenges. For example, transmissions may transmit to client computing platforms 104. The offers may correspond to the objectives and/or the stakes as defined through the challenge interface. For example, a particular offer may include information that represents a particular objective and a particular stake.

Challenge component 114 may be configured to generate sets of instructions to form smart contracts. In some implementations, the sets of instructions may be generated responsive to receipt of indications of acceptance (e.g., as received by interaction component 110). Smart contracts may be configured and/or programmed to determine results of challenges (such as, e.g., whether a particular player succeeded at the objective of a particular challenge). In some implementations, smart contracts may be configured and/or programmed to effectuate distributions of the stakes for challenges. The distributions may be based on the determined results of the challenges. The smart contracts may be added to and/or recorded on (one or more blocks of) blockchain 111a implemented by decentralized ledger server 111. For example, a blockchain, such as blockchain 111a, is a type of ledger, as well as a type of decentralized database that records rights pertaining to digital assets (including smart contracts), transactions, and/or other information. In some implementations, challenge component 114 may be configured to generate a set of instructions that codify a particular objective of a particular challenge into a particular smart contract. For example, different elements that are combined to form the particular objective may correspond to one of more of the generated instructions that form the particular smart contract.

Transfer component 116 may be configured to transfer generated sets of instructions (e.g., as generated by challenge component 114) to decentralized ledger server 111 and/or blockchain 111a. In some implementations, one or more of these instructions may instruct the formation of a smart contract and/or the recording of the smart contract on blockchain 111a. In some implementations, one or more of these instructions may instruct decentralized ledger server 111 to record and/or modify assets, transactions and/or rights on blockchain 111a. For example, transfer component 116 may transfer a particular set of instructions that, upon execution by blockchain 111a, obtain challenge-related information pertaining to a particular challenge, determine results of the particular challenge, and effectuate distribution of the stake for the particular challenge.

Monitoring component 118 may be configured to determine challenge-related information pertaining to challenges. For example, particular challenge-related information may pertain to a particular challenge between a first user and a second user. Monitoring component 118 may be configured to monitor actions in the instance of the game by different users. Based on these in-game actions, monitoring component 118 may determine whether any users succeeded at the objective of a particular challenge. For example, an objective may include at least one of collecting a particular amount or number of a particular virtual item in the instance of the game, defeating a particular number of enemies of a particular type in the instance of the game, completing a particular level in the instance of the game, beating a particular opponent at a race in the instance of the game, discovering a given virtual item in the instance of the game, building a particular virtual object in the instance of the game, reaching a particular location in the instance of the game, and/or other objectives. In some implementations, monitoring component 118 may obtain challenge-related information from a blockchain oracle (e.g., providing off-chain data to blockchain 111a or to monitoring component 118, regarding actions, activities, and/or events occurring in the instance of the game, or, more generally, within online gaming platform 105). Monitoring may occur in an ongoing manner. The term "ongoing manner" as used herein may refer to continuing to perform an action (e.g., monitoring) periodically (e.g., every 30 seconds, every minute, every hour, etc.) until receipt of an indication to terminate. For example, the indication to terminate may include powering off client computing platform 104 and/or other indications of termination.

Receipt component 136 may be configured to receive (sets of) instructions to add, modify, and/or remove recorded rights in blockchain 111a. For example, receipt component 136 may receive one or more sets of instructions from transfer component 116, online gaming platform 105, and/or other components of system 100. Receipt component 136 may provide received sets of instructions to record component 134 for execution. In some implementations, execution of individual ones of the instructions received may include invoking one or more function calls of an Application Programming Interface (API). For example, the API may be configured to provide interactive communication between blockchain 111a and other components of system 100. For example, in some implementations, API function calls may be implemented as function calls to smart contracts stored on blockchain 111a. In some implementations, receipt component 136 may be arranged, organized, and/or otherwise included in decentralized ledger server 111 and/or blockchain 111a.

Record component 134 may be configured to record (ownership) rights pertaining to digital assets, e.g., on blockchain 111a. In some implementations, record component 134 may record rights on electronic storage 130a. In some implementations, record component 134 may record rights on blockchain 111a. The rights may include ownership rights, distribution rights, and/or other rights. For example, particular recorded rights may reflect ownership of a particular digital asset by a particular user or group of users. For example, the particular digital asset may be not fungible, and may represent a three-dimensional in-game user-controllable item or character that can interact with other virtual items within online gaming platform 105. Recorded rights may be asset-specific. For example, distribution rights for a particular digital asset may designate rights to certain distributions of benefits upon an exchange involving the particular digital asset.

In some implementations, record component 134 may be configured to record rights in blockchain 111a. In some implementations, record component 134 may add, modify, and/or remove recorded rights. For example, in accordance with received instructions from receipt component 136, record component 134 may transfer ownership of a particular digital asset from a first owner to a second owner (e.g., from an original owner to a new owner, or from a loser to a winner) such that the recorded rights on blockchain 111a no longer reflect the ownership of the particular digital asset by the first user. In some implementations, in accordance with received instructions, record component 134 may transfer ownership of a particular digital asset temporarily, e.g., from a first owner to a temporary second owner such as a smart contract. In some case, a temporary owner may be a holding account that is merely used until ownership is transferred to either the original owner or a new owner. As used herein, the term "temporary" (and derivatives thereof) refers to a transfer or to ownership that is either known to be changed and/or modified within a predetermined period, or expected to be changed and/or modified within a predetermined period. Conversely, a non-temporary transfer from a first owner to a second owner (due to a particular exchange) can conceivably be changed and/or reverted (back from the second owner to the first owner) due to a separate and new exchange that is independent of the first particular exchange. In some implementations, in accordance with received instructions, record component 134 may transfer ownership of a particular digital asset non-temporarily from a first owner to a second owner, e.g., when a particular exchange is not reversible or no longer reversible. In some implementations, record component 134 may be arranged, organized, and/or otherwise included in blockchain 111a.

In some implementations, record component 134 may be configured to obtain asset-specific rights (e.g., ownership rights, distribution rights, and/or other rights) for particular digital assets. In some implementations, record component 134 may be configured to access blockchain 111a to obtain the asset-specific rights (that are recorded on blockchain 111a, e.g., in one or more smart contracts).

Referring to FIG. 1, user interfaces 125 may be configured to facilitate interaction between users 123 and system 100 and/or between users 123 and client computing platforms 104. For example, user interfaces 125 may provide an interface (e.g., a challenge interface) through which users 123 may provide information to and/or receive information from system 100. In some implementations, user interface 125 may include one or more of a display screen, touchscreen, monitor, a keyboard, buttons, switches, knobs, levers, mouse, microphones, sensors to capture voice commands, sensors to capture body movement, sensors to capture hand and/or finger gestures, and/or other user interface devices configured to receive and/or convey user input. In some implementations, one or more user interfaces 125 may be included in one or more client computing platforms 104. In some implementations, one or more user interfaces 125 may be included in system 100. In some implementations, user interface 125 may be a type of interface that facilitates the exchange of virtual items between users.

Figure 3:
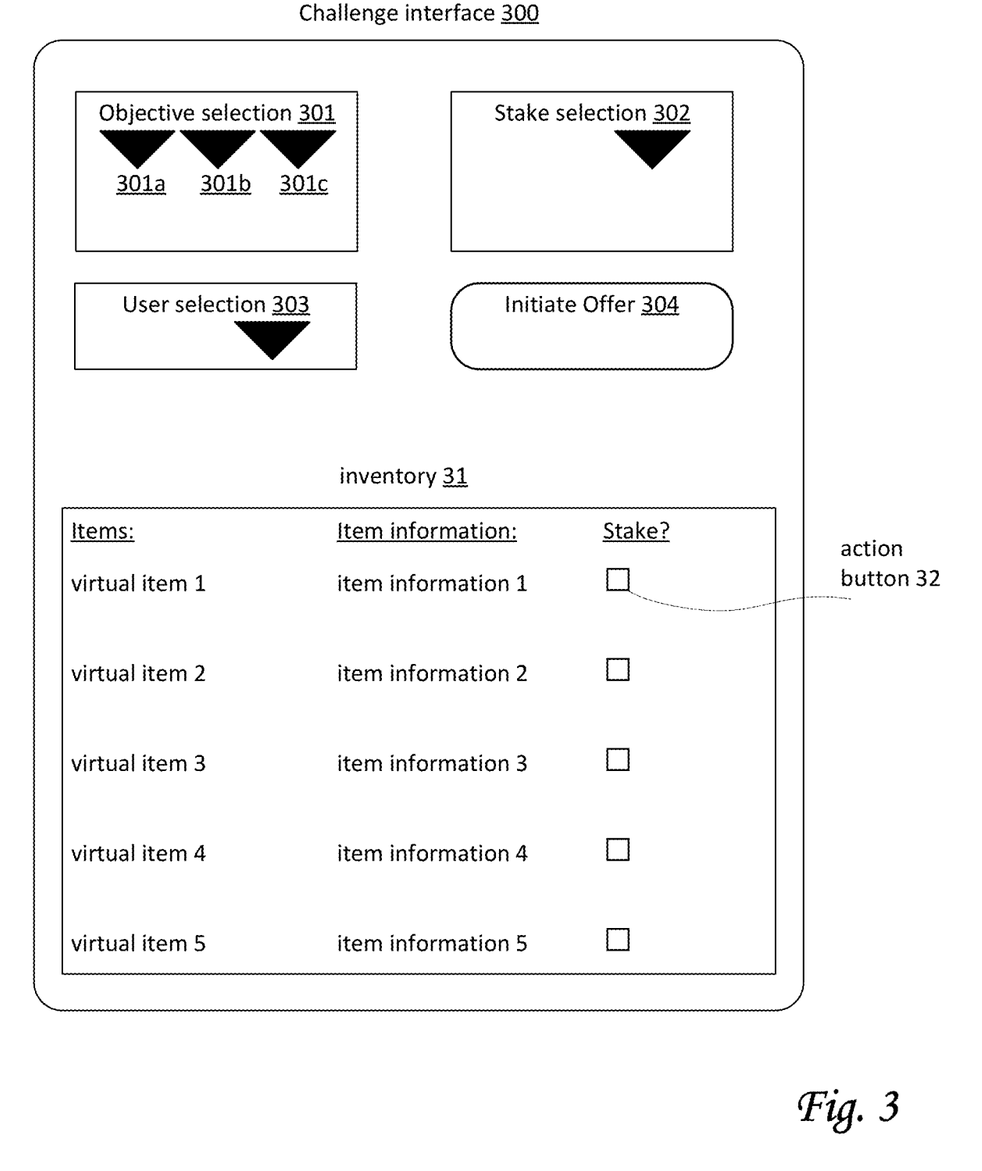
FIG. 3 illustrates an example implementation of a challenge interface, as may be used by a system configured to provide provable fairness for challenges among users in an online gaming platform, in accordance with one or more implementations.

FIG. 3 illustrates an example implementation of a challenge interface 300 as may be used by system 100, in accordance with one or more implementations. Challenge interface 300 may enable users to define challenge and transmit the challenges to one or more other users. Challenge interface 300 may include a section or field for objective selection 301, a section or field for stake selection 302, a section or field for user selection 303, an action button to initiate offer 304, a section or field for inventory 31, and/or other graphical user interface elements. Objective selection 301 may enable a user to enter and/or select an objective, through one or more graphical user interface elements, for a particular challenge (e.g., through one or more text fields or one or more dropdown menus, as indicated by the filled-in triangles 301a, 301b, and 301c inside objective selection 301). In some implementations, objective selection 301 may include different elements that together form the objective. One of the elements may be represented by triangle 301a, which could mean one of the following parts of an objective: the first participating user to do "X", the fastest participating user to do "X", the last participating user to do "X", etc. etc. Another element may be represented by triangle 301b, which could mean one of the following parts of an objective: join a race, reach a location, collect certain objects, defeat certain enemies, complete a particular level, build a particular object, etc. etc. Another element may be represented by triangle 301c, which could mean one of the following parts of an objective: in the next 15 minutes, starting from a particular moment in time, starting after a certain trigger event, for a particular duration, etc. etc. These different elements may be combined to form an objective (e.g., a combination of the elements selected by triangle 301a, triangle 301b, and triangle 301c). In some implementations, individual elements (e.g., the elements selected by triangle 301a, triangle 301b, and triangle 301c) may individually correspond to one or more instructions that form the related smart contract. Stake selection 302 may enable a user to enter and/or select a stake, through one or more graphical user interface elements, for the particular challenge (e.g., through a text field or a dropdown menu). For example, the stake may be an item from inventory 31. For example, in some implementations, the user may be able to drag an item from inventory 31 into stake selection 302. User selection 303 may enable a user to enter and/or select one or more other users as the proposed participating users in the particular challenge (e.g., through a text field or a dropdown menu). The action button "initiate offer 304" may enable the user to initiate a transmission to the proposed participating users that represents an offer to partake in the particular challenge (as defined through, at least, objective selection 301 and stake selection 302). As depicted, user inventory 41 may include a list of different virtual items and/or assets currently owned by a particular user, including virtual items 1-2-3-4-5. Inventory 31 further depicts item information regarding these virtual items, as indicated by item information 1-2-3-4-5, which correspond to virtual items 1-2-3-4-5, respectively. User inventory 31 as depicted may further include graphical user interface elements such as, by way of non-limiting example, an action button 32. Upon engagement by a user, action button 32 may select "virtual item 1" to be added to the stake for a particular challenge (e.g., via stake selection 302). In some implementations, the user may drag items from inventory 41 into field stake selection 302.

Figure 4A:
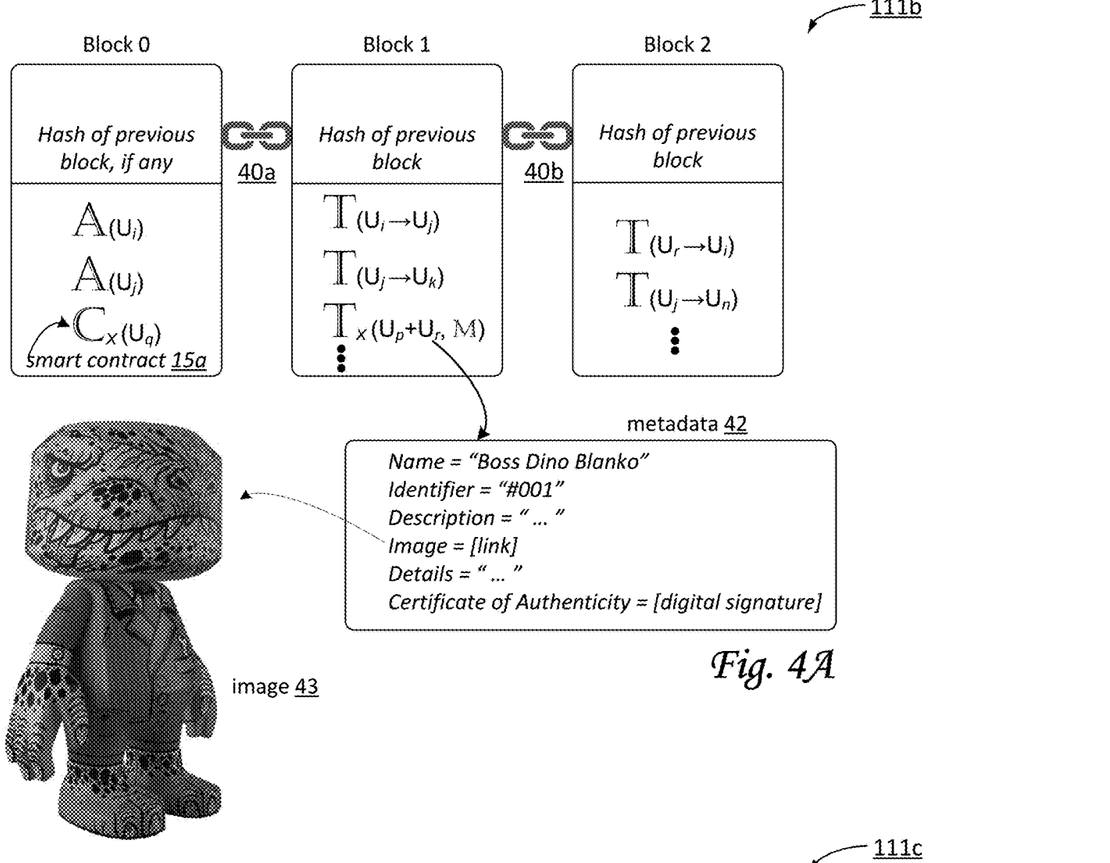
FIGS. 4A-4B illustrates exemplary blockchains, as may be used by a system configured to provide provable fairness for challenges among users in an online gaming platform, in accordance with one or more implementations.

FIG. 4A illustrate exemplary blockchain 111b as may be used by system 100, in accordance with one or more implementations. FIG. 4A illustrates a blockchain 111b that includes a block 0, a block 1, and a block 2. As time progresses, more blocks may be added to blockchain 111b. The blocks within blockchain 111b are ordered. In block 0, three assets (indicated by a capital "A") are generated and/or assigned to three users or participants: a first digital asset is assigned to user "i" ($U_i$), a second digital asset is assigned to user "j" ($U_j$), and a third digital asset, smart contract 15a, is assigned to user "q" ($U_q$), which may be an administrative user. For example, smart contract 15a may be or include a template for challenge-specific smart contracts. For example, smart contract 15a may have been generated by challenge component 114 (or by a set of instructions that were in turn generated by challenge component 114), or by another component of system 100. Smart contract 15a may have been posted to blockchain 111b by a component similar to record component 134. In some implementations, smart contract 15a may be recorded on blockchain 111b as soon as one or more (or all) participating users agree and/or accept a particular challenge as defined in smart contract 15a (or as defined in a transaction to smart contract 15a).

For example, the assets in block 0 may be individual ownership rights recorded for particular digital assets within an online gaming platform. Block 1 is connected to block 0 (as indicated by a link 40a), for example by including an address of block 1 in block 0, or vice versa. Likewise, block 1 is connected to block 2, as indicated by a link 40b. In block 1, a transaction to smart contract 15a (indicated by "Tx") is recorded, e.g., for a specific challenge. Transaction Tx to smart contract 15a may define a particular challenge between user "p" and user "r", for the stake defined by metadata 42 (here, including a not-fungible token named "Boss Dino Blanko", as depicted by image 43). In block 2, several transactions may be recorded: a transaction from user "j" to user "n", and a transaction from user "r" to user "i".

Figure 4B:
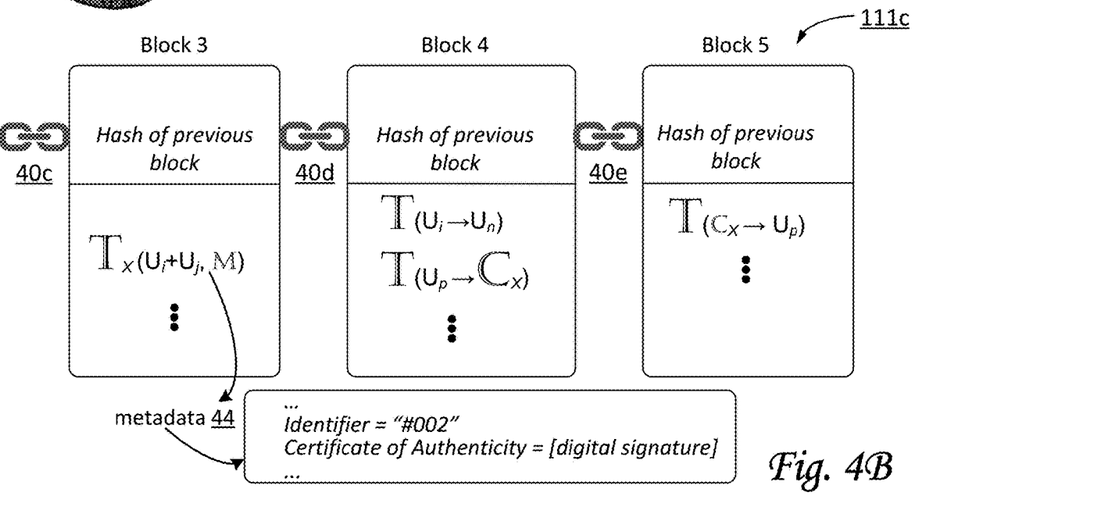

By way of non-limiting example, FIG. 4B illustrates a blockchain 111c that includes the same blocks as blockchain 111b of FIG. 4A, plus additional blocks (block 3, block 4, block 5) that have been appended to the blockchain. Block 3 may be connected to block 2 (as indicated by a link 40c), block 4 may be connected to block 3 (as indicated by a link 40d), and block 5 may be connected to block 4 (as indicated by a link 40e). In block 3, another transaction to smart contract 15a (indicated by "Tx") is recorded, e.g., for a different specific challenge. This transaction Tx to smart contract 15a may define a particular challenge between user "i" and user "j", for the stake defined by metadata 44 (e.g., one or more virtual items). Block 4 includes a transaction (indicated by a capital "T") from user "i" to user "n". For example, the transaction may represent a purchase of a first virtual item by user n from seller user "i". Additionally, block 4 includes a transaction from user "p" to smart contract 15a. For example, the transaction may represent user "p" being determined the winner of the particular challenge between user "p" and user "r" (in other words, user "p" succeeded in the objective of this particular challenge). Block 5 includes a transaction (by smart contract 15a) representing a transfer of the stake (here, not-fungible token named "Boss Dino Blanko", as depicted by image 43) from user "r" to user "p", since user "p" won this particular challenge.

Referring to FIG. 1, in some implementations, server(s) 102, client computing platform(s) 104, and/or external resources 138 may be operatively linked via one or more electronic communication links. For example, such electronic communication links may be established, at least in part, via one or more networks 13 such as the Internet and/or other networks. It will be appreciated that this is not intended to be limiting, and that the scope of this disclosure includes implementations in which server(s) 102, client computing platform(s) 104, and/or external resources 138 may be operatively linked via some other communication media.

A given client computing platform 104 may include one or more processors configured to execute computer program components. The computer program components may be configured to enable an expert or user associated with the given client computing platform 104 to interface with system 100 and/or external resources 138, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 138 may include sources of information outside of system 100, external entities participating with system 100, external providers of computation and/or storage services, and/or other resources. In some implementations, some or all of the functionality attributed herein to external resources 138 may be provided by resources included in system 100. In some implementations, external resources 138 may include one or more blockchain oracles (as may be used by monitoring component 118 to determine results for challenges).

Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 130 may comprise non-transitory storage media that electronically stores information. The electronic storage media of electronic storage 130 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 130 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 130 may include one or more virtual storage resources (e.g., cloud storage, a virtual private network, and/or other virtual storage resources). Electronic storage 130 may store software algorithms, information determined by processor(s) 132, information received from server(s) 102, information received from client computing platform(s) 104, and/or other information that enables server(s) 102 to function as described herein.

Processor(s) 132 may be configured to provide information processing capabilities in server(s) 102. As such, processor(s) 132 may include one or more of a digital processor, an analog processor, a digital circuit designed to process information, an analog circuit designed to process information, a state machine, and/or other mechanisms for electronically processing information. Although processor(s) 132 is shown in FIG. 1 as a single entity, this is for illustrative purposes only. In some implementations, processor(s) 132 may include a plurality of processing units. These processing units may be physically located within the same device, or processor(s) 132 may represent processing functionality of a plurality of devices operating in coordination. Processor(s) 132 may be configured to execute components 108, 110, 112, 114, 116, 118, 134 and/or 136, and/or other components. Processor(s) 132 may be configured to execute components 108, 110, 112, 114, 116, 118, 134 and/or 136, and/or other components by software; hardware; firmware; some combination of software, hardware, and/or firmware; and/or other mechanisms for configuring processing capabilities on processor(s) 132. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, 114, 116, 118, 134 and/or 136 are illustrated in FIG. 1 as being implemented within a single processing unit, in implementations in which processor(s) 132 includes multiple processing units, one or more of components 108, 110, 112, 114, 116, 118, 134 and/or 136 may be implemented remotely from the other components. The description of the functionality provided by the different components 108, 110, 112, 114, 116, 118, 134 and/or 136 described below is for illustrative purposes, and is not intended to be limiting, as any of components 108, 110, 112, 114, 116, 118, 134 and/or 136 may provide more or less functionality than is described. For example, one or more of components 108, 110, 112, 114, 116, 118, 134 and/or 136 may be eliminated, and some or all of its functionality may be provided by other ones of components 108, 110, 112, 114, 116, 118, 134 and/or 136. As another example, processor(s) 132 may be configured to execute one or more additional components that may perform some or all of the functionality attributed below to one of components 108, 110, 112, 114, 116, 118, 134 and/or 136.

Figure 2:
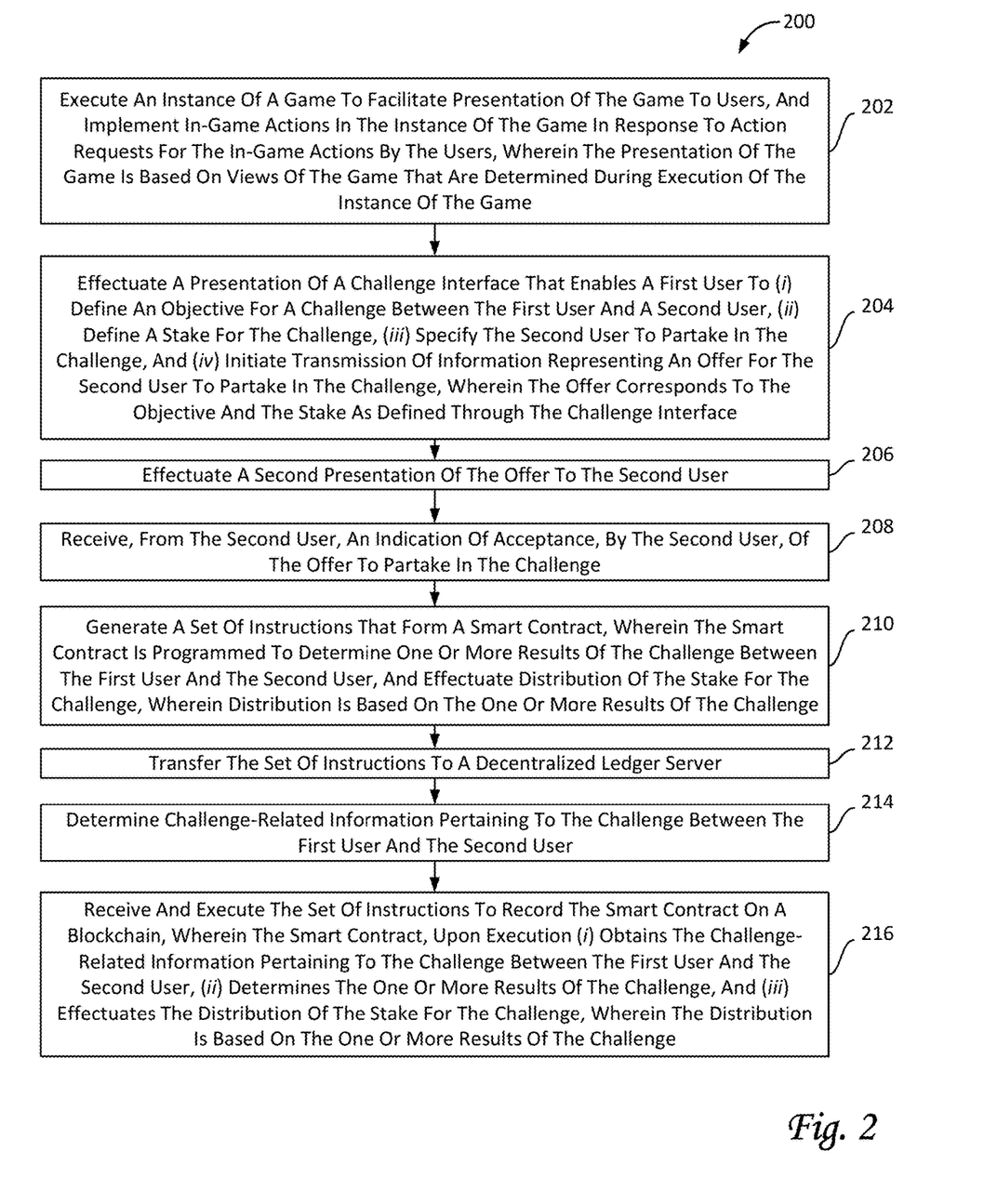
FIG. 2 illustrates a method to provide provable fairness for challenges among users in an online gaming platform, in accordance with one or more implementations.

FIG. 2 illustrates a method 200 to enable users to provide provable fairness for challenges among users in an online gaming platform, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

At an operation 202, an instance of a game is executed, within an online gaming platform, to facilitate presentation of the game to users, and in-game actions are implemented in the instance of the game in response to action requests for the in-game actions by the users. The presentation of the game is based on views of the game that are determined during execution of the instance of the game. The users include a first user, a second user, and a third user that interact with the instance of the game. In some embodiments, operation 202 is performed by a game component the same as or similar to game component 108 (shown in FIG. 1 and described herein).

At an operation 204, a presentation of a challenge interface is effectuated that enables a first user to (i) define an objective for a challenge between the first user and a second user. The challenge takes place within the instance of the game, (ii) define a stake for the challenge. The stake includes one or more virtual items and/or objects that are usable within the online gaming platform, (iii) specify the second user to partake in the challenge, and (iv) initiate transmission of information representing an offer for the second user to partake in the challenge. The information is transmitted to a client computing platform associated with the second user. The offer corresponds to the objective and the stake as defined through the challenge interface. In some embodiments, operation 204 is performed by a presentation component the same as or similar to presentation component 112 (shown in FIG. 1 and described herein).

At an operation 206, a second presentation is effectuated of the offer to the second user. In some embodiments, operation 206 is performed by a presentation component the same as or similar to presentation component 112 (shown in FIG. 1 and described herein).

At an operation 208, an indication of acceptance is received, from the client computing platform associated with the second user, of the offer to partake in the challenge. In some embodiments, operation 208 is performed by an interaction component the same as or similar to interaction component 110 (shown in FIG. 1 and described herein).

At an operation 210, a set of instructions is generated that form a smart contract. The smart contract is programmed to determine one or more results of the challenge between the first user and the second user, and effectuate distribution of the stake for the challenge. Distribution is based on the one or more results of the challenge. In some embodiments, operation 210 is performed by a challenge component the same as or similar to challenge component 114 (shown in FIG. 1 and described herein).

At an operation 212, the set of instructions is transferred to a decentralized ledger server. In some embodiments, operation 212 is performed by a transfer component the same as or similar to transfer component 116 (shown in FIG. 1 and described herein).

At an operation 214, challenge-related information is determined pertaining to the challenge between the first user and the second user. In some embodiments, operation 214 is performed by a monitoring component the same as or similar to monitoring component 118 (shown in FIG. 1 and described herein).

At an operation 216, the set of instructions to record the smart contract on a blockchain is received and executed. The smart contract, upon execution (i) obtains the challenge-related information pertaining to the challenge between the first user and the second user, (ii) determines the one or more results of the challenge, and (iii) effectuates the distribution of the stake for the challenge. The distribution is based on the one or more results of the challenge. In some embodiments, operation 216 is performed by one or both of a record component and a receipt component the same as or similar to record component 134 and receipt component 136 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. It is to be understood that the present technology contemplates that, to the extent possible, one or more features of any implementation can be combined with features of any other implementation.

What is claimed is:

1. A system configured to provide provable fairness for challenges among users in an online gaming platform, the system comprising:
one or more processors configured by machine-readable instructions to:
execute, within the online gaming platform, an instance of a game to facilitate presentation of the game to the users, and implement in-game actions in the instance of the game in response to action requests for the in-game actions by the users, wherein presentation of the game is based on views of the game that are determined during execution of the instance of the game, wherein the users include a first user and a second user that interact with the instance of the game;
effectuate a presentation of a challenge interface that enables the first user to:
(i) define an objective for a challenge between the first user and the second user, wherein the challenge takes place within the instance of the game, wherein the challenge interface enables selection and/or entry of one or more elements that are part of the objective,
(ii) define a stake for the challenge, wherein the stake includes one or more virtual items and/or objects that are usable within the online gaming platform, wherein the challenge interface enables selection and/or entry of one or more elements that are part of the stake,
(iii) specify the second user to partake in the challenge, and
(iv) initiate transmission of information representing an offer for the second user to partake in the challenge, wherein the information is transmitted to a client computing platform associated with the second user, wherein the offer corresponds to the objective and the stake as defined through the challenge interface;
effectuate a second presentation of the offer to the second user;

receive, from the client computing platform associated with the second user, an indication of acceptance, by the second user, of the offer to partake in the challenge;

generate a set of instructions that form a smart contract that is blockchain-executable, wherein the smart contract is configured to:
  (i) determine one or more results of the challenge between the first user and the second user, and
  (ii) effectuate distribution of the stake for the challenge, wherein distribution is based on the one or more results of the challenge;

transfer the set of instructions to a decentralized ledger server; and determine challenge-related information pertaining to the challenge between the first user and the second user; and the decentralized ledger server comprising one or more processors configured by machine-readable instructions to:

receive and execute the set of instructions to record the smart contract on a blockchain, wherein the smart contract, upon execution on the blockchain:
  (i) obtains the challenge-related information pertaining to the challenge between the first user and the second user,
  (ii) determines the one or more results of the challenge, and
  (iii) effectuates the distribution of the stake for the challenge, wherein the distribution is based on the one or more results of the challenge.

2. The system of claim 1, wherein the stake includes a first set of one or more virtual items that are provided by the first user, and a second set of one or more virtual items that are provided by the second user.

3. The system of claim 1, wherein ownership of the stake is transferred to a third party prior to commencement of the challenge, and wherein the distribution of the stake includes transferring ownership of the stake from the third party to either the first or second user.

4. The system of claim 1, wherein the objective includes at least one of:
  (a) collecting a particular amount or number of a particular virtual item in the instance of the game,
  (b) defeating a particular number of enemies of a particular type in the instance of the game,
  (c) completing a particular level in the instance of the game,
  (d) beating a particular opponent at a race in the instance of the game,
  (e) discovering a given virtual item in the instance of the game,
  (f) building a particular virtual object in the instance of the game, and
  (g) reaching a particular location in the instance of the game.

5. The system of claim 1, wherein the stake further includes an amount of a currency.

6. The system of claim 1, wherein individual ones of the elements correspond to one or more instructions that form the smart contract.

7. The system of claim 1, wherein challenge-related information is determined by a monitoring component configured to monitor actions in the instance of the game by the first user and the second user.

8. The system of claim 1, wherein the stake includes ownership of a user-controllable character that is used to partake in the challenge.

9. A method to provide provable fairness for challenges among users in an online gaming platform, the method comprising:

executing, within the online gaming platform, an instance of a game to facilitate presentation of the game to users, and implementing in-game actions in the instance of the game in response to action requests for the in-game actions by the users, wherein the presentation of the game is based on views of the game that are determined during execution of the instance of the game, wherein the users include a first user and a second user that interact with the instance of the game;

effectuating a presentation of a challenge interface that enables the first user to (i) define an objective for a challenge between the first user and the second user, wherein the challenge takes place within the instance of the game, wherein the challenge interface enables selection and/or entry of one or more elements that are part of the objective, (ii) define a stake for the challenge, wherein the stake includes one or more virtual items and/or objects that are usable within the online gaming platform, wherein the challenge interface enables selection and/or entry of one or more elements that are part of the stake, (iii) specify the second user to partake in the challenge, and (iv) initiate transmission of information representing an offer for the second user to partake in the challenge, wherein the information is transmitted to a client computing platform associated with the second user, wherein the offer corresponds to the objective and the stake as defined through the challenge interface;

effectuating a second presentation of the offer to the second user;

receiving, from the client computing platform associated with the second user, an indication of acceptance, by the second user, of the offer to partake in the challenge;

generating a set of instructions that form a smart contract, wherein the smart contract is programmed to determine one or more results of the challenge between the first user and the second user, and effectuate distribution of the stake for the challenge, wherein distribution is based on the one or more results of the challenge;

transferring the set of instructions to a decentralized ledger server;

determining challenge-related information pertaining to the challenge between the first user and the second user; and receiving and executing the set of instructions to record the smart contract on a blockchain, wherein the smart contract, upon execution (i) obtains the challenge-related information pertaining to the challenge between the first user and the second user, (ii) determines the one or more results of the challenge, and (iii) effectuates the distribution of the stake for the challenge, wherein the distribution is based on the one or more results of the challenge.

10. The method of claim 9, wherein the stake includes a first set of one or more virtual items that are provided by the first user, and a second set of one or more virtual items that are provided by the second user.

11. The method of claim 9, wherein ownership of the stake is transferred to a third party prior to commencement of the challenge, and wherein the distribution of the stake includes transferring ownership of the stake from the third party to either the first or second user.

12. The method of claim 9, wherein the objective includes at least one of:
   (a) collecting a particular amount or number of a particular virtual item in the instance of the game,
   (b) defeating a particular number of enemies of a particular type in the instance of the game,
   (c) completing a particular level in the instance of the game,
   (d) beating a particular opponent at a race in the instance of the game,
   (e) discovering a given virtual item in the instance of the game,
   (f) building a particular virtual object in the instance of the game, and
   (g) reaching a particular location in the instance of the game.

13. The method of claim 9, wherein the stake further includes an amount of a currency.

14. The method of claim 9, wherein individual ones of the elements correspond to one or more instructions that form the smart contract.

15. The method of claim 9, wherein challenge-related information is determined by a monitoring component that monitors actions in the instance of the game by the first user and the second user.

16. The method of claim 9, wherein the stake includes ownership of a user-controllable character that is used to partake in the challenge.

\* \* \* \* \*